United States Patent
Vidal et al.

(10) Patent No.: US 6,905,136 B2
(45) Date of Patent: Jun. 14, 2005

(54) COLLAPSIBLE SUPPORT

(75) Inventors: Paulo Vidal, Billericay (GB); Paul Pickett, Rayleigh (GB); Andrew John Cooke, Brentwood (GB)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/304,801

(22) Filed: Nov. 26, 2002

(65) Prior Publication Data

US 2003/0184070 A1 Oct. 2, 2003

(30) Foreign Application Priority Data

Mar. 28, 2002 (GB) .............................................. 0207277

(51) Int. Cl.⁷ .......................................... B60R 21/045
(52) U.S. Cl. .................................................... 280/752
(58) Field of Search .............................. 280/752, 751, 280/748; 296/188; 188/371, 377; 180/371, 377

(56) References Cited

U.S. PATENT DOCUMENTS

| | | | | |
|---|---|---|---|---|
| 3,203,723 A | * | 8/1965 | Montenare .................. 293/108 |
| 3,715,130 A | * | 2/1973 | Harada et al. .............. 280/738 |
| 3,998,485 A | * | 12/1976 | Putter et al. ................ 293/133 |
| 4,190,276 A | * | 2/1980 | Hirano et al. .............. 293/133 |
| 5,476,284 A | | 12/1995 | DuRocher et al. | |
| 5,498,045 A | * | 3/1996 | Morgan et al. ............. 293/122 |
| 5,549,327 A | * | 8/1996 | Rusche et al. .............. 280/751 |
| 5,732,801 A | * | 3/1998 | Gertz .......................... 188/377 |
| 6,179,355 B1 | | 1/2001 | Chou et al. | |
| 6,293,587 B1 | | 9/2001 | Lapic et al. | |
| 6,312,028 B1 | * | 11/2001 | Wilkosz ...................... 293/133 |
| 6,609,727 B2 | | 8/2003 | Figlioli et al. | |

FOREIGN PATENT DOCUMENTS

| | | |
|---|---|---|
| GB | 1279881 | 6/1969 |
| GB | 2278580 | 12/1994 |
| WO | WO 97/39254 | 10/1997 |
| WO | WO 01/14077 | 3/2001 |

* cited by examiner

*Primary Examiner*—Faye M. Fleming
(74) *Attorney, Agent, or Firm*—Brinks Hofer Gilson & Lione

(57) ABSTRACT

The present invention relates to a collapsible support (1) for absorbing energy during an impact, particularly to a support for an automobile knee bolster (50). The collapsible support (1) has the form of a tubular body with closed ends. The body extends along a longitudinal axis (3) along which it will collapse during an impact. The support (1) has two opposing end walls (4,10) substantially perpendicular to the axis (3). The two end walls (4,10) are connected by four similar stepped side walls (8) of rectangular plan form that substantially enclose the longitudinal axis (3) such that the side and end walls (8,4,10) of the collapsible support (1) substantially enclose an internal volume. The tubular body is adapted to deform so that sections (31–35) of side walls 8 collapse with one section moving inside another adjacent section upon the application of a compressive force applied to said body along said axis 3.

16 Claims, 3 Drawing Sheets

COLLAPSIBLE SUPPORT

TECHNICAL FIELD

The present invention relates to a collapsible support for absorbing energy during an impact. The invention is of particular relevance to energy absorbing devices for an automobile knee bolsters.

BACKGROUND

Energy absorption within the instrument panel assembly of an automobile is desirable during a frontal automobile crash to control the loads transmitted to an occupant and thereby reduce the likelihood of injury when an occupant makes contact with the instrument panel.

During a frontal crash, an occupant will tend to slide forward in their seat. As a result, it is possible that the knees of the occupant may strike a lower portion of the instrument panel at the front of the cabin. If the knees strike the instrument panel or other surface at the front of the cabin with sufficient force, the femur or other bones of the occupant may be broken, or other injuries sustained. An energy absorbing knee bolster, often a padded portion of the instrument panel, may be provided in a location where an occupant's knees are likely to strike. As the knees of the occupant strike the knee bolster, the knee bolster cushions the knees and absorbs at least some of the energy of the impact, thereby reducing the maximum load transmitted to the occupant.

It is known to provide deformable supports for knee bolsters in automobiles. These supports are located between the knee bolster and a bracket that fixes the knee bolster to the instrument panel of the automobile. The support will deform or collapse and absorb some of the energy of the impact when an occupant's knees strike the knee bolster. Thus, the maximum load transmitted to an occupant during an impact will be reduced.

Conventional deformable supports are curved metallic sections that roll-up or flex during an impact, or are made from extruded metallic sections that are crushed during an impact. Such metal sections are both relatively costly and inconvenient components to include in a collapsible support for absorbing energy during an impact.

SUMMARY

In accordance with an aspect of the invention there is provided a collapsible support for absorbing energy during an impact. The collapsible support includes a hollow tubular body that extends along a longitudinal axis, the tubular body has at least one side wall that extend around said axis, the at least one side wall has at least two sections, adjacent sections of a side wall being separated by a step in the cross-section of the side wall when viewed in a plane parallel to said axis, wherein the tubular body is adapted to deform so that sections of wall collapse with one section moving inside another section upon the application of a compressive force applied to the tubular body along the longitudinal axis.

In accordance with another aspect of the invention, there is provided an apparatus for absorbing the energy of an impact of a moving body. The apparatus includes an impact pad for receiving contact of said moving body, a rigid support structure, and at least one collapsible support between the impact pad and the support structure. The collapsible supports is arranged to collapse and absorb energy upon contact of said moving body on the impact pad. Further, the collapsible support(s) extends along the longitudinal axis between the support structure and the impact pad.

In still another aspect of the invention, the tubular body may be generally circular or oval as viewed in a cross-section transverse to the longitudinal axis. In another embodiment of the invention, however, the tubular body is generally square or rectangular as viewed in a cross-section transverse to the longitudinal axis, and the side walls forms a stepped pyramid.

In order to help sections move inside adjacent sections as the support collapses, the step in or each wall is preferably a step in both an outer surface of said wall, and an inner surface of said wall.

In yet another embodiment of the invention, the tubular body has a first end wall and a second end wall, the side wall(s) then extending between the said end walls. The side wall(s) and the end walls may then substantially enclose a hollow internal volume.

In use, the collapsible support is preferably arranged between a mounting bracket and a movable member with which an impact may occur. The longitudinal axis of the support is preferably substantially aligned with the expected direction of an impact force such that the collapse of the support will tend to occur in the direction of the impact. This will allow the collapse of the support to control the load deflection characteristics of the system experienced during an impact between an object and the movable member.

In automobile knee bolster energy absorbing apparatus, there is preferably a collapsible support at each end of a knee bolster to allow either end of the knee bolster to move during an impact. The two collapsible supports may be connected by a single steel cross brace upon which the knee bolster is also supported. The cross brace allows an impact load to be distributed between the supports.

Since a collapsible support according to an aspect of the invention is of particular relevance to an automobile knee bolster energy absorption apparatus, another aspect of the invention provides a knee bolster energy absorbing apparatus in which the knee bolster is supported by at least one collapsible support according to the invention. It should be understood that the present invention may be of wider general applicability than this, for example collapsible supports may support a panel with which a person's head, or a fragile object, may make contact. The collapsible supports collapsing to reduce damage in the event of an impact.

The steps in the stepped side wall provide several locations along the side wall at which the collapse of the support may be initiated due to stress concentration at the steps. During collapse of the collapsible support along the longitudinal axis, the stepped side wall will buckle and absorb at least some of the energy of the impact. The thickness of the side walls can be varied to alter the characteristics of the collapse of the support. Thinner walls would permit collapse with lower applied forces and with less energy absorbed, while thicker walls would result in more energy absorbed, but with higher applied forces required.

Substantially enclosing an internal volume can substantially trap air, another gas, or even a liquid within the support. During collapse of the support the gas may be compressed within the support or the gas or liquid may be expelled from the support, thereby increasing the energy dissipation of the support as it collapses. It is presently preferred that air is substantially trapped within the support and the invention will be described hereafter with reference to this preferred embodiment although it should be understood that the invention is not so limited.

The escape of the trapped air preferably occurs through vent apertures located through the end and or side walls. The size and shape of the vent apertures may be varied to permit different flow rates or flow patterns of air from the support and thereby control the deformation of the support. Some or all of the vent apertures may also include a membrane covering the aperture that prevents gas flow initially, but breaks if the gas pressure within the support increases above a predetermined limit. This allows a further degree of control over the characteristics of the collapse of the support.

The rate of collapse and energy absorption of the support can be readily controlled using at least two variables, the side wall thickness and the size of the vent apertures, without altering the external shape of the support. The size and profile of each step, the number of steps and the separation of the steps in the side wall or the size and shape of the end walls could also be varied to alter the collapse of the support in the event of an impact.

The end walls of the support may be adapted to facilitate attachment to another surface. The attachment may be made using separate fasteners such as screws or fir-tree connectors, or fasteners that are formed integrally with the surfaces or support, for instance on an end wall of the support. For example, the end walls may include projections that aid the correct location of the support in a corresponding recess or hole in the surface. Preferably the projections are cylindrical, and they preferably have a threaded inner bore to accept a threaded fix such as a screw so that the support can be securely attached to the surface.

The end walls may additionally/alternatively include a metal insert to which a fastener may be secured. The metal insert may be within the end wall or attached to it either internally or externally. The metal insert may include an aperture to accept a fastener, and preferably includes a threaded bore to accept a threaded fastener.

Preferably the force required to cause collapse of the knee bolster system along the longitudinal axis is less than about 10 kN. It is preferred that the force required to cause collapse is less than about 7 kN, as fracture of the femur is likely to occur if the peak load applied to the knee along the femur is above about 10 kN. Once collapse of the support has been initiated a force is preferably required to continue the collapse, as this will increase energy dissipation during collapse. The force to continue the collapse is preferably between about 3–7 kN and preferably between 4–6 kN as such forces resist the collapse of the support to dissipate energy.

Preferably the support is made of a plastics material. A plastics material may be lighter than a metal alternative and may also be cheaper and/or easier to form into the desired hollow shape of the support.

It is preferred that the side and end walls of the support are formed by blow moulding, and preferably in a single stage of blow moulding. Blow moulding can be used to create three-dimensional hollow plastic articles quickly and cheaply. Once the walls have been formed, vent apertures or metal inserts may be added, or these may be included during the moulding stage. The thickness of the walls of the support can be varied during the moulding stage to provide supports with different collapse characteristics, this allows supports for applications requiring different characteristics to be moulded using a single tool.

Preferably, the cross-section of the support tapers along the longitudinal axis such that the cross-section of the support reduces along the longitudinal axis. Deformation of the support is most likely to be initiated at a step at or near the narrower end of the support, as any force will be concentrated in a narrower perimeter. The tapering allows greater control of the deformation of the support and may allow the steps of the side walls to collapse inside one another telescopically.

These and other aspects and advantages of the present invention will become apparent upon reading the following detailed description of the invention in combination with the accompanying drawings.

BRIEF DESCRIPTION OF THE FIGURES

The invention will now be further described, by way of example, with reference to the accompanying drawings, in which.

DETAILED DESCRIPTION

Figure 1:
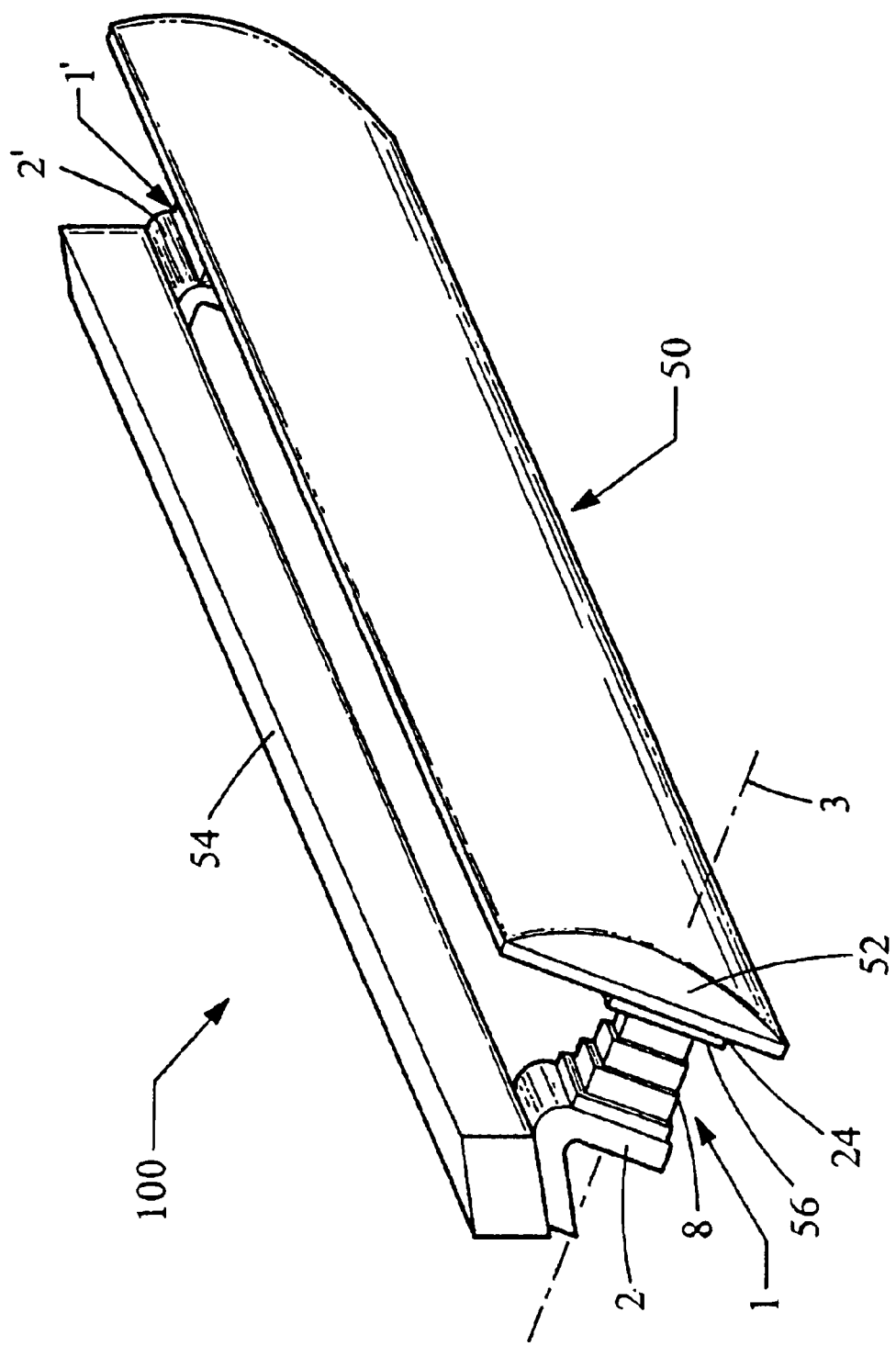
FIG. 1 shows a perspective view of a knee bolster energy absorbing apparatus for an automobile.

FIG. 1 shows a perspective view of a knee bolster energy absorbing apparatus 100. A knee bolster 50 comprising a back plate 24 and a front panel 52 is attached to brackets 2,2' on an automobile beam 54 by collapsible supports 1,1' of hollow tubular form. A cross beam 56 is located on the back plate 24 of the knee bolster 50. The back plate 24 connects the two collapsible supports 1,1'. It should be understood that a cross beam is not essential to the working of the present invention. The knee bolster could alternatively be a one-piece design.

During a crash the knees of an occupant in the automobile may impact with the knee bolster 50. The front 52 may absorb some of the energy, but if the force of the impact is large enough, the collapsible supports 1,1' will collapse and absorb more of the energy of the impact. The energy absorption controls the load and forward movement experienced by the occupant and thereby reduces the likelihood of injury to an occupant during a crash. Without the knee bolster energy absorbing apparatus 100, the knees of an occupant could make contact with hard components within the automobile which could be more likely to cause injury.

Figure 2:
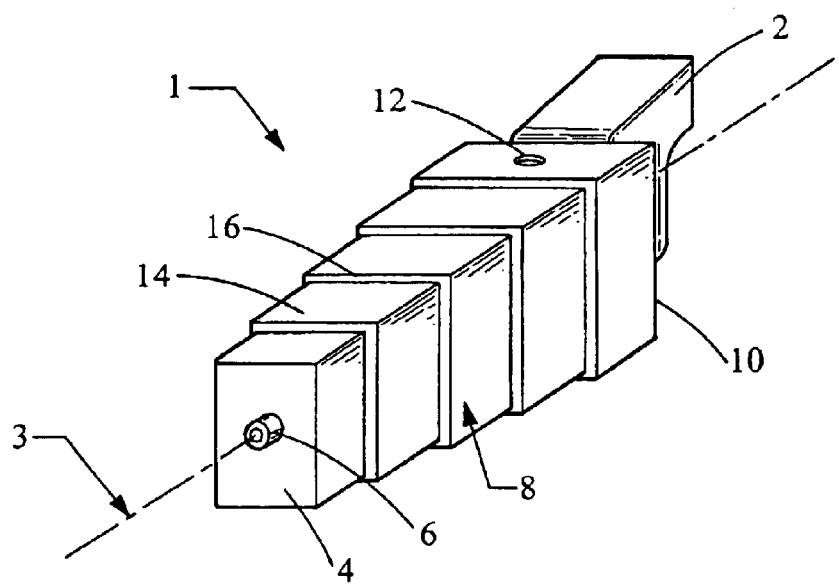
FIG. 2 is a perspective view of a collapsible support according to the invention.

FIG. 2 shows a collapsible support 1 attached to a rigid mounting bracket 2. The support has an axis 3 along which support 1 is adapted to collapse during an impact. The support 1 has a first end wall 4 substantially perpendicular to the axis 3 with sides of about 55 mm by 20 mm.

The first end wall 4 includes a fastening boss in the form of a cylindrical projection 6. The support 1 has four similar stepped side walls 8, arranged in a rectangular plan about the axis 3. Each side wall 8 connects the first end wall 4 to a second end wall 10 that has sides of about 75 mm by 40 mm. The first end wall 4 is separated from the second end wall 10 by about 115 mm. The side and end walls 4,8,10 are formed in blow moulded plastic about 2.5 mm thick.

Each side wall 8 has five sections 31–35 separated by four steps 36–39. The sections 31–35 are each parallel with and offset laterally from the axis 3. Each step 31–39 extends perpendicularly from the axis 3. Each section has parallel inner and outer wall surfaces 40,41, with the inner wall surface of one section being latterly offset, either inside or outside, from the outer wall surface 41 of the adjacent section. This offset helps one section move inside and adjacent section as the support 1 collapses.

The stepped side walls 8 form a truncated stepped pyramid shaped shell with a rectangular cross-section between the first end wall 4 and second end wall 10. From the first end wall 4 each step of the side wall 8 increases the cross-section of the support 1 until the side wall 8 joins with the second end wall 10. The stepped side wall 8 has flat sections 14 substantially parallel with the axis 3 and step sections 16 substantially perpendicular with the axis 3. Each step 16 increases or decreases the plan area of the support. The result is that one step may substantially fit within an adjacent step to allow the support 1 to collapse substantially telescopically upon application of a sufficient force along axis 3.

The side wall 8 includes a vent aperture 12 that allows communication between the volume enclosed within the support and the outside of the support. The vent aperture 12 is located in the flat section 14 adjacent the second end wall 10 as this is likely to be the final step that collapses.

Figure 3:
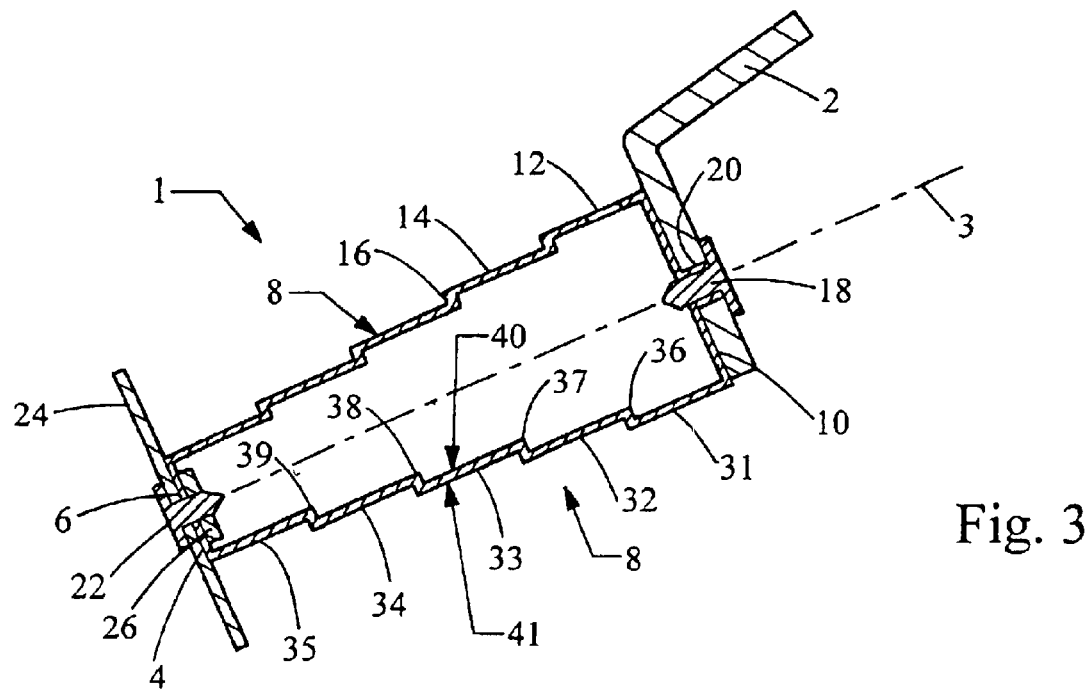
FIG. 3 is a cross-sectional view of the collapsible support of FIG. 2.

FIG. 3 shows a cross-section through the collapsible support 1 of FIG. 2. The support 1 is attached to the mounting bracket 2 by a screw 18. The second end wall 10 includes a hollow cylindrical projection 20 that is located in an aperture through the bracket 2. The screw 18 is then secured into the cylindrical projection 18 to secure the support 1 to bracket 2. Another screw 22 secures back plate 24 of the knee bolster to the support 1 in a similar way, except that the screw 22 is also secured into a metal insert 26 moulded within the end wall 4.

Figure 4:
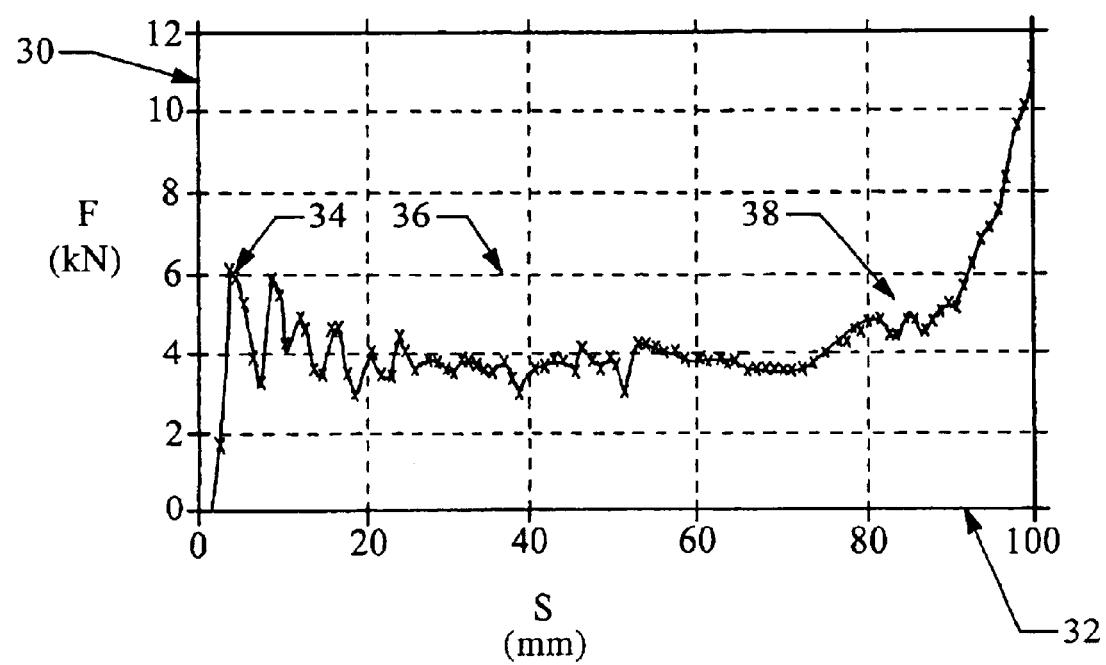
FIG. 4 is a graph showing the force applied to the support of FIG. 2 versus the displacement of one end wall relative to the other end wall.

FIG. 4 is a graph of Force (kN) (F) 30 versus Displacement (mm) (S) 32 for collapsible support 1. As can be seen from the graph, the peak force 34 required to initiate the collapse of the support 1 is about 6 kN. The force 36 required to continue the collapse is between 3 kN and 5 kN until the support is substantially fully compressed 38 when the two end walls 4,10 have been moved together by about 90 mm.

It should be understood that the support could have a variety of cross-sections, such as circular, square or other polygon, but rectangular is currently preferred due to the ease of storage and manufacture.

The present invention has been described above purely by way of example. It should be noted that modifications in detail may be made within the scope of the invention as defined in the claims.

What is claimed is:

1. A collapsible support for absorbing energy during an impact, the collapsible support comprising:
    a hollow tubular body made of a plastic material that extends along a longitudinal axis, the tubular body having a first end wall, a second end wall, and at least one side wall that extends around the axis and between said wall ends, the at least one side wall having at least two sections, adjacent sections of the aide wall being separated by a step in the cross-section of said side wall when viewed in a plane parallel to said axis, and wherein the end walls and at least one side wall enclose a hollow volume, and
    wherein the step in the at least one side wall is a step in both an outer surface of said wall and an inner surface of said wall, and
    wherein a vent aperture is disposed in one of the side walls, and
    wherein the tubular body is adapted to deform so that sections of wall collapse with one section moving inside another section upon the application of a compressive force applied to said body along said axis.

2. The collapsible support as claimed in claim 1, wherein the tubular body is generally square or rectangular as viewed in a cross-section transverse to the longitudinal axis.

3. The support as claimed in claim 2, wherein the at least one side wall forms a stepped pyramid.

4. The collapsible support as claimed in claim 1, wherein the tubular body is generally circular or oval as viewed in a cross-section transverse to the longitudinal axis.

5. The collapsible support as claimed in claim 1, wherein the at least one side wall includes a vent aperture by which air inside the hollow volume may escape when the tubular body deforms.

6. The collapsible support as claimed in claim 1, wherein a force required to collapse the support is less than 10 kN.

7. The collapsible support as claimed in claim 6, wherein the force required to collapse the support is less than 7 kN.

8. The collapsible support as claimed in claim 1, wherein the support is made from a blow molded plastics material.

9. An apparatus for absorbing the energy of an impact of a moving body, comprising:
    a knee bolster for receiving the impact of said moving body;
    a rigid support structure; and
    at toast one collapsible support between the knee bolster and the support structure arranged to collapse and absorb energy upon contact of said moving body on the knee bolster; and
    wherein said collapsible support includes a first and second end wall that defines a hollow volume and extends along the longitudinal axis between the support structure and the knee bolster, arid is made of a plastic material.

10. The apparatus as claimed in claim 9, wherein the at least one collapsible support includes a side wall and wherein the side wall tapers towards the longitudinal axis from the support structure to the knee bolster.

11. The apparatus as claimed in claim 9, wherein the collapsible support is joined to the knee bolster by the first end wall.

12. The apparatus as claimed in claim 11, wherein the second end wall includes a threaded metal insert for a screw by which the knee bolster is joined to the collapsible support.

13. The apparatus as claimed in claim 9, wherein the knee bolster is joined to the support structure by at least two spaced-apart collapsible supports that are connected by a cross-beam that extends across the knee bolster.

14. The apparatus as claimed in claim 9, wherein the collapsible support is joined to the support structure by the second end wall.

15. The apparatus as claimed in claim 14, wherein the first end wall has a fastening boss that engages with a recess in the support structure when the collapsible support is joined to the support structure.

16. The apparatus as claimed in claim 15, wherein the cylindrical protrusion has a threaded bare for a screw by which the support structure is joined to the collapsible support.

* * * * *